Jan. 31, 1961
G. P. BENTLEY ET AL
2,970,307
DIGITALIZERS
Filed Feb. 8, 1957
3 Sheets-Sheet 1
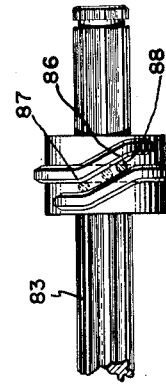
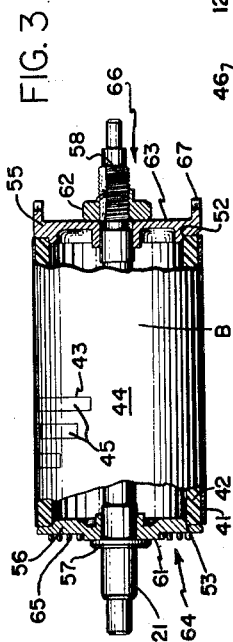
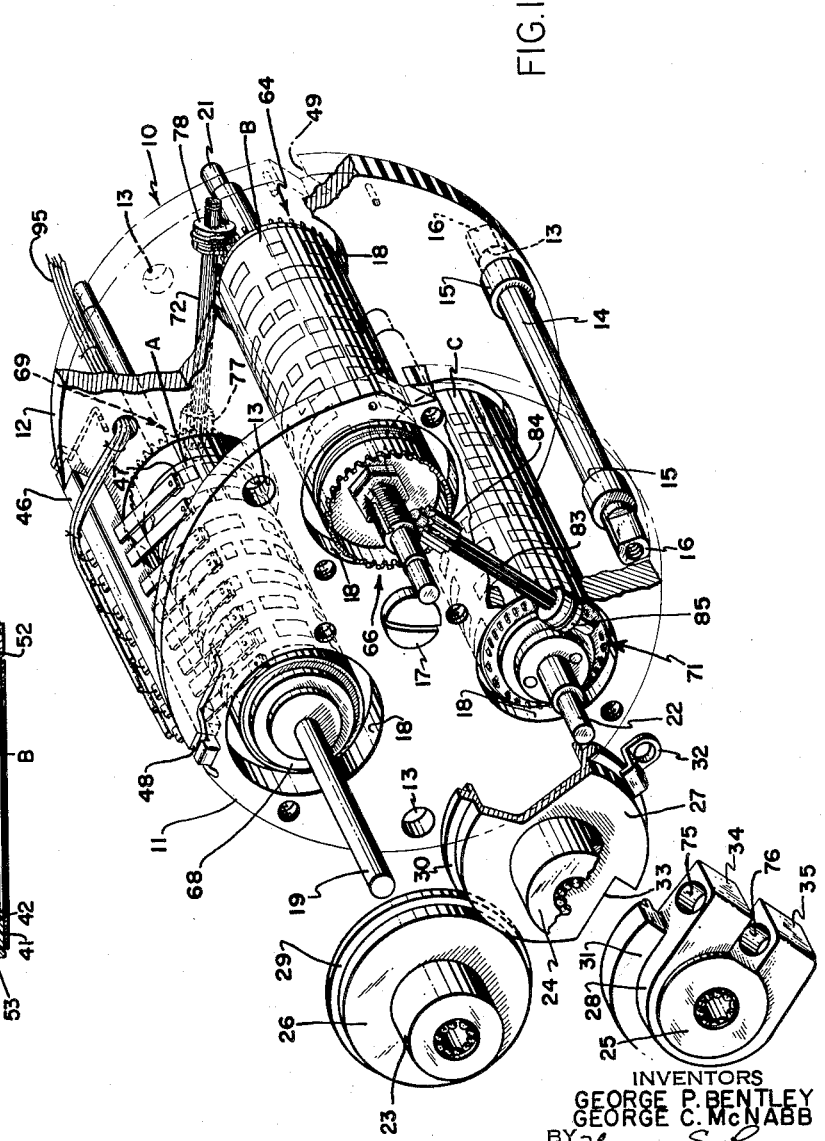
INVENTORS
GEORGE P. BENTLEY
GEORGE C. McNABB
BY Thomas S. Ross
Joseph R. Spalla
ATTORNEYS Jan. 31, 1961

G. P. BENTLEY ET AL 2,970,307

DIGITALIZERS

Filed Feb. 8, 1957

INVENTORS
GEORGE P. BENTLEY
GEORGE C. McNABB
BY *Thomas S. Ross*
*Joseph R. Spalla*
ATTORNEYS Jan. 31, 1961 G. P. BENTLEY ET AL 2,970,307
DIGITALIZERS
Filed Feb. 8, 1957 3 Sheets-Sheet 3
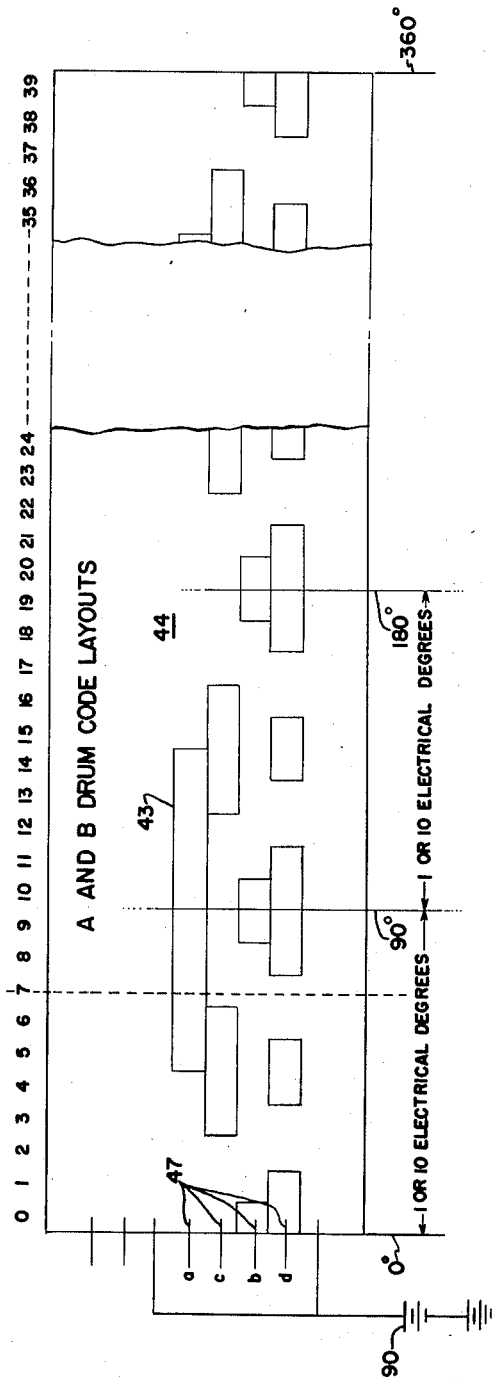
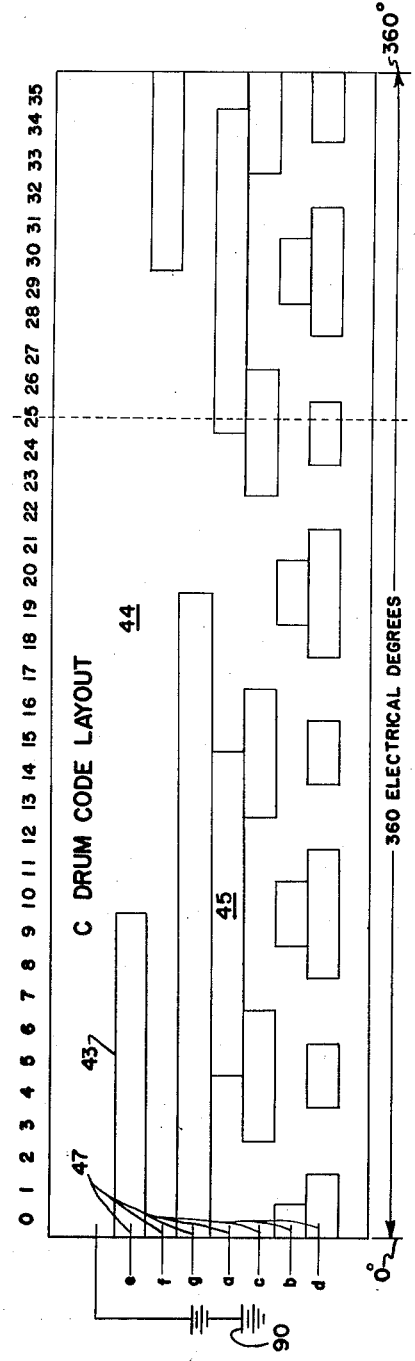
FIG.5
INVENTORS
GEORGE P. BENTLEY
GEORGE C. McNABB
BY Thomas S. Rose
Joseph R. Spalla
ATTORNEYS

United States Patent Office 2,970,307
Patented Jan. 31, 1961

2,970,307

DIGITALIZERS

George P. Bentley, Franklin, and George C. McNabb, Attleboro, Mass., assignors to Instrument Development Laboratories, Inc., Attleboro, Mass., a corporation of New York Filed Feb. 8, 1957, Ser. No. 639,090

4 Claims. (Cl. 340—347)

This invention relates broadly to analog to digital converters or digitalizers which find employment in various and numerous applications, example of which are computors, instrument reading, and shaft position indicating devices; more particularly it relates to shaft position digitalizers which employ motion transfer devices between the lowest and succeeding incremental orders which rapidly and smoothly permit motion transfers between said lowest and succeeding orders whereby a shaft position may be converted into a large number of discrete readouts; and specifically it relates to a small compact electrical digitalizer, including in combination a plurality of lightweight minimum inertia drums each coded in a binary notation and representative of a different order, and novel mechanical drive constructions between drum orders which enable rapid and accurate conversions of rotary shaft positions into a plurality of discrete electrical signals.

Generally to convert a motion (analog) into digital form, the path of motion is calibrated in discrete increments, each increment being representative of predetermined digits, or the path of motion is coded in a binary notation representative of discrete digits. Where a digitalizer must convert a 360° shaft rotation, for example, into a large number of discrete increments representing shaft positions, and space is at a premium, it is necessary to employ a plurality of drums representative of different incremental orders such as tenths, units, tens, hundreds, etc. As each order reaches its highest increment, the next succeeding order must move one increment thereby recording or storing the angular motion of the first drum whereby it may repeat its order and again move said next succeeding drum one increment until said next succeeding drum goes to the highest increment in its particular order thereby moving the next following drum one increment and so forth. For example, where an angular measurement of from 0–100° is to be made in tenths of a degree, a three coded drum series could be employed; the first drum representing tenths, the second units, and the third tens; each being provided with ten increments. If the first travels ten revolutions or 100 $\frac{1}{10}$° increments, the second will travel one revolution or ten 1° increments and the third one tenth revolution or $\frac{1}{10}$° increment. Where fine measurements of rapidly rotating shafts are to be made, coded drums are usually employed whereby a plurality of angular positions may be rapidly digitalized and readout electrically through the use of brush contacts riding the surfaces of the coded drums. In the instant invention binary coding is employed, which although requiring more readout brushes makes machine recognition simpler.

In the prior art, the drive sequences between each of a series of drum orders are either continuous or intermittent. Continuous drive sequences are unsatisfactory in that their speed capabilities, and more important, the reliability of the digital readout, particularly over long periods of time leaves much to be desired. These disadvantages are believed to be due in part to errors resulting from brush contacts bridging two different digital representations on the continuous moving drum surface, and also to errors as a result of play between gears in each drive sequence. Since the drive sequences are in series, errors due to play are multiplied, until in the final drive sequence they are appreciable and particularly over long periods of time, with the result that the readout is inaccurate by one or more increments. The intermittent drive sequences heretofore in use through overcoming the type of errors mentioned above are limited in speed capability, accuracy and in useful life because of the fact that the rotating members in the drive sequence are intermittently subjected to high impact loads and high angular accelerations. Because of these high impact loads, intermittently applied, operation is not smooth and the speed capabilities of the unit employing such drive sequences are limited. Also because the reflected inertias of the intermittently moving parts is appreciable the torque required to intermittently drive one or more drums in a series varies with the number of drums in motion.

The instant invention overcomes the disadvantages of the prior art in providing a small compact unit employing drive mechanisms between and in combination with substantially inertialess drums which carry coded digital representations of different incremental orders, for example, tenths, units and tens. The drive mechanisms reduce high angular accelerations or impact loads to a minimum and because the drums driven by said mechanisms are of a minimum weight, reflected inertias are also reduced to a minimum whereby the intermittent transition of a drum in a series from a stationary condition, through its motion and back, is smooth. As a result the speed capabilities of digitalizers employing intermittent drives is increased. The accuracy of the readout then is improved through minimization of high impact loads and reflected inertias inherent in the gear arrangements of the prior art. The above is accomplished by providing lightweight drums in combination with properly timed drive mechanisms including cams which intermittently drive succeeding drum orders, said cams being driven at predetermined speeds in relation to preceding drum speeds and the number of increments on said drums, whereby the intermittent motion occurs during one incremental passage of the preceding drums, and wherein said cams have displacement versus time lift surfaces such that smoother transitions from stationary conditions are obtained with a minimum of impact and reflected inertia.

An object of the invention therefore is to provide a small, compact digitalizer capable of rapid and accurate translations of rotating shaft positions into discrete digits.

Another object of the invention is the provision of drve mechanisms between and in combination with lightweight drums in a series whereby motion transfer between drums is rapid and exact, occurring simultaneously with the passage of a preceding drum through only one increment.

Still another object of the invention is the provision of motion transfer mechanisms between digitalizer drums which minimize high angular accelerations of the rotating parts whereby the torque demand necessary to drive the series of drums is substantially reduced.

A further object is to provide a digitalizer wherein the readouts are accurate and reliable over long periods of time.

A still further object is the provision of a shaft position digitalizer for converting a shaft position into electrical sgnals which may be employed to actuate a printer, card punch mechanism or to modulate a transmitter for telemetering to a remote station.

Another object of the invention is the provision of an analog to digital converter which has a small lightweight compact and relatively simple construction wherein reflected inertias of moving parts are minimized.

Another object of the invention is to provide a digitalizer which is compact and one which at the same time retains a relatively large contact area for each brush.

Other objects and many of the attendant advantages of this invention will be readily appreciated as the same becomes better understood by reference to the following detailed description when considered in connection with the accompanying drawings in which like reference numerals designate like parts throughout the figures thereof and wherein;

Fig. 1 is a partially exploded perspective view with parts cut away of a digitalizer construction incorporating novel motion transfer devices in combination with lightweight code drums in accordance with the invention;

Fig. 3 is a cross sectional view of one of the drum assemblies in the digitalizer assembly of Fig. 1;

Fig. 4 is an enlarged view of a cam employed in the digitalizer of Fig. 1;

Fig. 5 is a layout of a code which serves to illustrate the operation of a tenth degree digitalizer in accordance with the instant invention.

Figure 2:
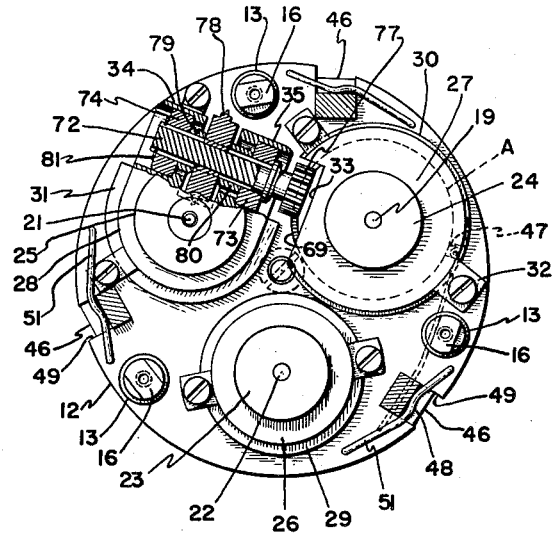
Fig. 2 is a rear end view of the digitalizer shown in Fig. 1.

Referring now to the drawings, wherein like reference characters designate like or corresponding parts throughout the several views, there is shown in Fig. 1 a three drum digitalizer, generally designated by reference numeral 10, for converting an angular shaft rotation of from 0° to 360° or vice versa into a plurality of discrete electrical readouts which together represent the angular position of a rotatable shaft.

The digitalizer comprises a pair of identical front and rear circular support walls 11 and 12 respectively, each of which is provided with three equally radially spaced holes 13 disposed at 120° intervals around and adjacent its peripheral edge. Three wall separator pins 14, only one of which is shown, are each provided with collars 15 adjacent each end 16 which are adapted to hold the support walls spaced apart a distance equivalent to the length of drums adapted to be mounted between them. As seen in Fig. 1 the pin ends 16 are inserted in the holes 13 in the support walls with the collars 15 adjacent the ends 16 abutting the inner surfaces of said support walls 11 and 12 whereby they are prevented from coming together. The support walls are prevented from moving away from each other by a centrally disposed bolt 17 or the like extending from wall 11 and threaded in wall 12 which urges the walls together against the collars on the pins.

Each of the support walls 11 and 12 are further provided with three relatively large diameter holes 18 equally spaced radially from the center of the support walls and disposed at 120° intervals, with the holes in wall 11 opposite to those in wall 12. Shafts 19, 21, and 22, having their axes coincident with the center of the holes 18, are supported for rotation between walls 11 and 12 in bearing housings 23, 24 and 25, adapted to be secured to support wall 11, and oppositely disposed bearing housings 24, 25 and 23 (Fig. 2) respectively, adapted to be secured to support wall 12. The bearing housings 23, 24 and 25, respectively are formed integral with cylindrical hollow bases 26 and 27 and a substantially semicylindrical hollow base 28 all equal in outer radius to the radius of the holes 18. Each of the bases 26 and 27 are provided with cylindrical flanges 29 and 30 and each of the bases 28 with a substantially semi-cylindrical flange 31 whereby the bearing housings may be secured to the end walls 11 and 12 by any suitable means as by bolted down flange engaging clamps 32 or the like. As shown in Figs. 1 and 2 each of the bases 27 is formed with a cut away section 33 and each of the substantially semi-cylindrical bases 28 with two spaced rectangular shaped projections 34 and 35 extending tangentially from the open ends thereof for reasons which will be apparent with reference to Fig. 2.

The specific embodiment shown in Fig. 1 is a tenth degree digitalizer adapted to convert a 360° shaft rotation into 3600 discrete electrical readouts and employs three cylindrical lightweight minimum inertia drums, an A drum, a B drum and a C drum, all fixedly mounted on and for rotation with shafts 19, 21, and 22 respectively. The drums are coded and preferably in Gray code, each drum representing a series of increments in a particular order. The codes are set up so that the least significant digits or tenths are read from the A drum, unit degrees from the B drum and tens and hundreds of degrees from the C drum.

Each of the lightweight drums as most clearly shown in Fig. 3 is fabricated by permanently bonding a conductive cylindrical sheath 41 over a tubular core 42 of insulating material and thereafter etching away line portions 43 of the conductive sheath to form a series of conductive and non-conductive areas 44 and 45 respectively. The method of constructing these drums is more fully disclosed and claimed in copending application of Peter Betts and Joseph S. Lord Serial No. 641,899.

As hereinbefore stated the shaft mounted drums are disposed between the support walls in registry with the relatively large diameter holes 18 therein, with the shafts 19, 21 and 22 mounted for rotation in bearing housings 23 and 24, 24 and 25, and 25 and 23 respectively. Adapted to be operatively positioned with respect to said drums are three brush holders 46 supporting spring arms which carry carbon brushes 47 adapted to ride tangentially on the A, B and C drum surfaces. In the specific embodiment each holder carries 8 brushes. The brush holders 46 as seen in Figs. 1 and 2, are provided with grooves 48 adjacent their ends which rest in oppositely disposed notches 49 cut in the peripheral edges of the support walls 11 and 12 at 120° intervals and are secured to said walls by spring wire bails 51 or the like connected to said walls and interposed within said grooves.

Referring again to Fig. 3 there is shown the B drum mounted in accordance with the invention. As seen in this figure the tubular core 42 of the B drum is disposed over the shaft 21 and held in concentric fixed relation therewith between annulae 52 and 53 cut into the inner peripheral edges of circular centrally bored front and rear end plates 55 and 56 respectively. As clearly shown the end plates are urged together in tight abutting relationship with the ends of the B drum by inserting the shaft 21, which is provided with an enlarged annular portion 57 adjacent one end and with a threaded portion 58 adjacent the other end, into the bores of the end plates 55 and 56. The shoulder formed by the enlarged portion 57 of the shaft abuts the outer surface 61 of the rear end plate 56 and a nut 62 or the like, threaded on the threaded portion 58 of the shaft 21 and locked thereto by suitable means 62A, abuts the outer surface 63 of the front end plate 55. As is apparent the conductive sheath 41 bonded to the tubular core is not in contact with the end plates 55 and 56 and is therefore electrically isolated from the drum mounting which may be grounded.

The rear end plate 56 as clearly shown in Fig. 3 is fabricated selectively of steel or aluminum, in the form of a pinwheel, generally designated by 64, comprising a plurality of axially projecting pins 65 arranged in a circle concentric with the shaft axis and adjacent the peripheral edge of the outer surface 61. The front end plate 55 is machined selectively of steel or aluminum, in the form of a crown gear, generally designated by 66, comprising a plurality of axially projecting teeth 67 arranged in a circle concentric with the shaft axis about the peripheral edge of its outer surface 63. With this construction the torque resulting from impact loads intermittently applied to the pinwheel 64 is transmitted to the crown gear 66 through the end plates and the drum. The A and C drums are mounted in similar fashion. The front end plate 68 of the A drum however, is not provided with any projections while its rear end plate is provided with a crown gear 69; and the front end plate of the C drum is provided with a pinwheel 71 while its rear end plate is not provided with any projections.

In accordance with the invention, the A drum shaft 19 is adapted to be coupled through suitable step up gearing, 1:90 in the specific embodiment, to a shaft (not shown) whose angular rotation is to be measured. The shaft whose angular rotation is to be measured is coupled in this manner to the lowest order or A drum, rather than directly to the highest order or C drum so that rapid changes in angular position of said shaft may be smoothly introduced into the digitalizer unit and also to enable finer measurements.

As is evident from Fig. 1 the A drum is mounted with its crown gear 69 facing toward the rear support plate 12; the B drum is mounted with its pinwheel 64 facing toward the rear support plate and with its crown gear 66 toward the front support plate 11; and the C drum is mounted with its pinwheel 71 facing toward the front support plate 11.

The A and B drums are coupled together through a splined jackshaft 72 (Fig. 2) supported for rotation in bearings 73 and 74 mounted in bores 75 and 76 (as most clearly shown in Fig. 1) in the spaced projections 33 and 34 formed on the base 28 of the bearing housing 25 which is secured to the rear support wall 12 over the pinwheel 64 of the B drum shaft. A pinion gear 77 secured over one end of the jackshaft is adapted to mesh freely with the crown gear 69 on the A drum; the cut away section 33 in the base of the bearing housing 23 over the crown gear on the A drum exposing a section of the crown gear 69. The jackshaft 72 also mounts adjacent its other end a cylindrical cam 78 having a single lift surface. The cam is disposed in the space between said projections 34 and 35 and separated from the bearings 73 and 74 within the bores of the projections by spacers 79 and 80 which prevent any axial misalignment of the cam. The cam 78 when so mounted is positioned to engage and displace one pin on the pinwheel 64 once every revolution. A snap ring 81 or the like is mounted in an annulus at the end of the jackshaft to securely hold the jackshaft assembly and mounting together.

The B and C drums are coupled in similar fashion through a jackshaft 83 a pinion gear 84 and a cylindrical cam 85, said jackshaft 83 being mounted for rotation in the bearing housing 25 in the front support wall 11.

In the specific embodiment the A drum carries a 40 toothed crown gear; the B drum a 40 toothed pinwheel and a 40 toothed crown gear; and the C drum carries a 36 toothed pinwheel. Further in accordance with the specific embodiment of a tenth degree digitalizer the A drum surface is provided with 40 coded increments (Fig. 5) each representative of $\frac{1}{10}°$. Hence one revolution of the A drum represents 40 tenths of a degree or 4°. The B drum surface is provided with 40 coded 1° increments, one revolution thereof representing therefor 40°, and the C drum surface is provided with 36 coded 10° increments, one revolution representing therefor 360°. The pinion gears 77 and 84 between the A and B and B and C drums are provided with 10 teeth.

In operation the A drum shaft 19 is continuously driven by an input shaft and the B and C drums are intermittently driven in proper relationships one to another. As is apparent, since integral degrees are to be read off the B drum it must be advanced through 9° of angular travel four times, i.e. advanced 4 increments, for every revolution of the A drum. In accordance with the invention this intermittent motion of the B drum must occur in 9° angular travel of the A drum i.e. during one increment of the A drum. Similarly, C drum must advance one of its 10° increments 4 times for every revolution of the B drum, i.e. drum C must move 4 increments for every revolution of B drum and each movement must occur during one incremental motion of the B drum.

Since the cylindrical cams 78 and 85 are rotated at 4 times the speed of the preceding drum, due to the fact that jackshaft 72 is driven at 4 times the speed of drum A by the 4:1 ratio between the crown gear 69 and pinion 77, and the jackshaft 83 is driven at 4 times the speed of B drum through crown gear 66 and pinion 84, the intermittent motion of B and C drums through an increment (9° of travel) during a 9° interval (1 increment) of preceding drums A and B is accomplished by employing lift surfaces on each of the cylindrical cams 78 and 85 which cover an arc (between points 86 and 87 Fig. 4) representing 36° of angle of their respective jackshafts. It may be seen therefore that the camming action occurs during a 9° angular travel of the preceding drums once every 90° of angular travel thereof. As shown in Fig. 4 once every revolution, the cam engages a pin 88 (whose motion is shown in dotted lines) and pushes it toward the left one increment during the 36° camming interval.

For the above arrangement then, 90° (ten increments) of angular travel of the A drum, and during the last 9° (1 increment) of this travel, cam 78 advances drum B through a 9° angular travel (1 increment). Similarly in 90° of angular travel of B drum, and during the last 9° thereof, drum C advances 10° or 1 increment. The speed ratios of the drums in the above specific embodiment are therefore 10:1 between A and B drums and 9:1 between B and C drums or a total of 90:1 which is the reverse of the 1:90 ratio coupled to A drum shaft 19.

As may be determined from the above timing sequence, at certain points A drum advances B only, and at certain other points both B and C drums are driven simultaneously. In a train of this nature, where a constant speed member drives a second member intermittently and the second member drives a third intermittently, to obtain optimum conditions for minimum shock, maximum smoothness of operation, and maximum speed capability, requires at least two different types of intermittent drive.

In a specific application the required maximum speed of the A drum was 300 revolutions per minute or 12000 (40 increments×300) digital increments per minute. In such a case it may be seen that the intermittent drive between the A and B drums is subjected to 1200 impact loads per minute and between B and C drums 133⅓ impact loads per minute. Because of the high speed at which impact loads are delivered to the pinwheel 64 by cam 78, it is provided with a lift surface whose displacement versus time characteristic over the 36° camming interval is cycloidal in nature. Such a camming curve minimizes peak accelerations with the resulting reduction of the stresses on the drive pins 65 thereby permitting smooth transitions of the driven member, drum B, from a stationary condition through its necessary motion, and back to stationary condition. Since the final driven member, drum C, is driven by two intermittent drives, cams 78 and 85, and the first has a cycloidal characteristic, the effect of the cycloidal cam curve is obtained for all driven members beyond the A drum. Cam 85 is therefore provided with a constant velocity cam lift whose displacement versus time characteristic over the 36° camming interval is linear with some degree of fairing at each end. Cams 78 and 85 are fabricated of hard materials having high impact resistance and tensile strength, preferably hardened steel, to which a highly polished finish is applied.

Referring now to Fig. 5 there is shown an illustrative layout of 40, 40 and 36 increment codes imprinted in transverse columns from 0° to 360° on the conductive surfaces of the A, B and C drums respectively.

The codes shown, as will be understood by those skilled in the art, are Gray codes wherein the digital assignments are such that the conductive state of only one brush at a time changes as successive incremental columns pass beneath the readout brushes. As may be seen the A drum employs a four row code and hence four readout brushes arranged in an *a, c, b, d* order to correspond to the A, C, B, D order of the code which is so arranged to permit proper spacing of the coded areas on the drum surface. As is apparent the coded representation between stations 10 and 19 is the reflection of the coded representation between stations 0 and 9 and that the code between stations 20 and 39 is a repeat of the code between stations 0 and 19; each station representing 1/10°. Code drum B is similar in all respects to code drum A except that each incremental station represents 1°. Of the four remaining brushes carried by the A and B drum brush holders, two, which always ride conductive areas 44, are connected in parallel to a source of energization 90 to provide minimum contact resistance and maximum reliability in operation. The remaining two brushes are not necessary and are lifted. The C drum also employs a four row code arranged in an *a, c, b, d* order identical to that of the A and B drum codes, each representing 10°, and also an additional three coded rows *e, f, g* to enable reading out hundreds of degrees. As is apparent seven readout brushes are required, the eighth being connected to a source of energization 90 whereby the conductive areas 44 of the C drum will always be energized. As shown in the drawings the codes are ambiguous at stations 9 and 10, 19 and 20, 29 and 30 and 39 and 0. These ambiguities occur at times when a succeeding drum is being moved an increment thereby changing that succeeding drums' electrical readout or in the case of C drum a change in the *e, f, g* readout. This change as will be understood by those skilled in the art, will be employed in a decoding unit (not shown) to resolve the ambiguities. As is understood in the art any readout brushes 47 riding non-conductive areas 45 will not carry output current and those riding conductive areas 44 will carry current. For example, if the stations 7, 7, and 25 (shown in dotted lines in Fig. 5) were under the A, B, and C drum brushes respectively, the electrical readout of the A, B and C drums would be 0111, 0111 and 111 0100 respectively; the whole indicating 257.7° after conversion in a decoding unit.

Figure 6:
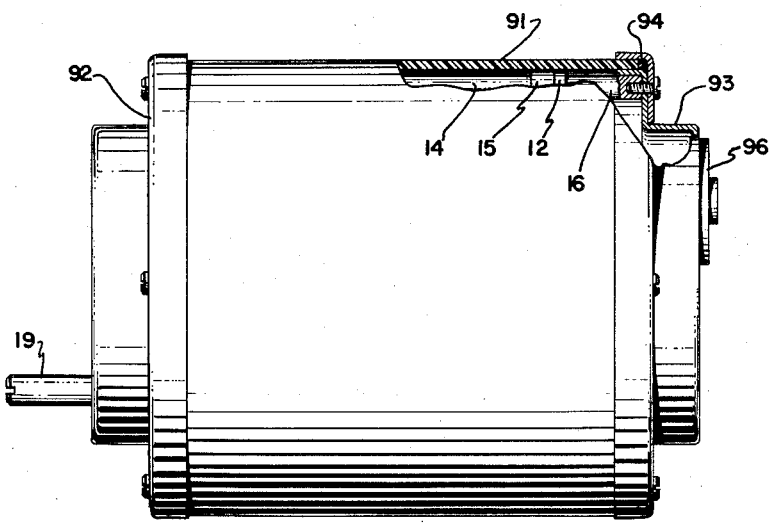
Fig. 6 is a plan view showing a dust enclosed digitalizer unit.

The digitalizer as described above may be inserted in a Plexiglas or aluminum sleeve 91 as shown in Fig. 6, which is securely held between end covers 92 and 93 provided with annular seals 94 of rubber or the like. The end covers are bolted to the internally threaded ends 16 (Fig. 1) of the support wall separator pins 14 thereby to effect a closed container for the unit. The conductors 95 (Fig. 1) connected to the brushes may be brought out through dust seals 96 in end cover 93 for connection to a utilization circuit. The completed unit then, drawn to full scale as shown in Fig. 6, has only the input shaft 19 extending from end cover 92 and conductors 95 from end cover 93.

In view of the above it may be seen that the described invention embodies a small compact digitalizer construction employing novel drive mechanisms in combination with lightweight minimum inertia drums whereby intermittent motion transfers are smoothly accomplished with the result that the speed capabilities and accuracy of digitalizer unit is increased.

While the embodiment described includes only one drive between drum orders, parallel drives, i.e. two jackshafts, two pinion gears and two cams, may be employed between each drum order, particularly with digitalizers employing more than three drum orders, e.g. a 5 drum tenth minute digitalizer. It should be understood, therefor, that the foregoing disclosure relates to only a preferred embodiment of the invention and that it is intended to cover all changes and modifications of the example of the invention herein chosen for the purpose of the disclosure, which do not constitute departures from the spirit and scope of the invention.

The invention claimed is:

1. A shaft position digitalizer comprising a pair of support walls, a series of cylindrical drums representing orders of increments rotatably mounted between said support walls, successive drums in said series representing successively higher orders of increments, the increments in said orders being represented by axially extending columns of conductive and nonconductive areas on the surfaces of said cylindrical drums, said areas being selectively axially located in accordance with a binary code, a plurality of axially aligned brush means mounted on said support walls for engagement with each of said drum surfaces for electrically reading out successively presented coded columns, means for driving the lowest order drum in said series at a predetermined speed related to the speed of a shaft whose angular position is to be digitalized, a plurality of intermittent motion transfer mechanisms respectively operatively connected between said drums in said series, each of said mechanisms comprising camming means driven by the lower order drum to intermittently accelerate and decelerate the higher order drum from a stationary condition through one increment and back to a stationary condition simultaneously with the passage of said lower order drum through the highest increment of an order represented thereby, and means on said higher order drums responsive to said camming means for rotating said higher order drums increment by increment.

2. A shaft position digitalizer comprising a pair of support walls, a series of cylindrical drums representing orders of increments rotatably mounted between said support walls, successive drums in said series representing successively higher orders of increments, the increments in said orders being represented by axially extending columns of conductive and nonconductive areas on the surfaces of said cylindrical drums, said areas being selectively axially located in accordance with a binary code, a plurality of axially aligned brush means mounted on said support walls for engagement with each of said drum surfaces for electrically reading out successively presented coded columns, means for driving the lowest order drum in said series at a predetermined speed related to the speed of a shaft whose angular position is to be digitalized, a plurality of intermittent motion transfer mechanism respectively operatively connected between said drums in said series, each of said mechanisms comprising a cylindrical cam having a single lift surface, means coupled to the lower order drum for rotating said cam through one revolution in response to rotation of said lower order drum through an order represented thereby, and a pinwheel mounted on said higher order drum, the lift surfaces of said cam being adapted upon each cam revolution to engage successive pins in said pinwheel thereby to rotate said higher order drum through one increment during passage of the lower order drum through the highest increment in an order represented thereby.

3. A shaft position digitalizer comprising a pair of support walls, a series of cylindrical drums representing orders of increments rotatably mounted between said support walls, successive drums in said series representing successively higher orders of increments, the increments in said orders being represented by axially extending columns of conductive and nonconductive areas on the surfaces of said cylindrical drums, said areas being selectively axially located in accordance with a binary code, a plurality of axially aligned brush means mounted on said support walls for engagement with each of said drum surfaces for electrically reading out successively presented coded columns, means for driving the lowest order drum in said series at a predetermined speed related to the speed of a shaft whose angular position is to be digitalized, a plurality of intermittent motion transfer mechanisms respectively operatively connected between said drums in said series, each of said mechanisms comprising a cylindrical cam having a single lift surface, means coupled to the lower order drum for rotating said cam through one revolution in response to rotation of said lower order drum through an order represented thereby, and a pinwheel mounted on said higher order drum, the lift surface of said cam being adapted upon each cam revolution to engage successive pins in said pinwheel thereby to rotate said higher order drum through one increment during passage of the lower order drum through the highest increment in an order represented thereby, said cam in the first mechanism of said series having a lift surface whose displacement versus time characteristic is cycloidal, and cams in subsequent mechanisms of said series having lift surfaces whose displacement versus time is linear.

4. A shaft position digitalizer comprising a pair of support walls, a series of cylindrical drums representing orders of increments rotatably mounted between said support walls, successive drums in said series representing successively higher orders of increments, the increments in said orders being represented by axially extending columns of conductive and nonconductive areas on the surfaces of said cylindrical drums, said areas being selectively axially located in accordance with a binary code, a plurality of axially aligned brush means mounted on said support walls for engagement with each of said drum surfaces for electrically reading out successively presented coded columns, means for driving the lowest order drum in said series at a predetermined speed related to the speed of a shaft whose angular position is to be digitalized, a plurality of intermittent motion transfer mechanisms respectively operatively connected between said drums in said series, each of said mechanisms comprising a crown gear mounted on the lower order drum, a pinwheel mounted on the higher order drum adjacent said crown gear and a jackshaft mounted for rotation on said support walls having on opposite ends respectively a pinion gear and a cylindrical cam having a single lift surface, said pinion being adapted to mesh with said crown gear to rotate said jackshaft and cam one revolution in response to rotation of the lower order drum through an order of increments represented thereby, said lift surface on said cam being adapted to engage upon each cam revolution a pin on the pinwheel of the higher order drum during passage of the lower order drum through the highest increment in an order represented thereby.

References Cited in the file of this patent

UNITED STATES PATENTS

| | | |
|---|---|---|
| 2,502,837 | Entz | Apr. 4, 1950 |
| 2,713,680 | Ackerlind | July 19, 1955 |